April 8, 1947.  R. G. LE TOURNEAU  2,418,588
SELF-PROPELLED DUMP WAGON
Filed July 17, 1944   3 Sheets-Sheet 1

Inventor
R. G. LeTourneau
Attorneys

April 8, 1947.    R. G. LE TOURNEAU    2,418,588
SELF-PROPELLED DUMP WAGON
Filed July 17, 1944    3 Sheets-Sheet 2

Inventor
R. G. LeTourneau
By
Corbett & Corbett
Attorneys

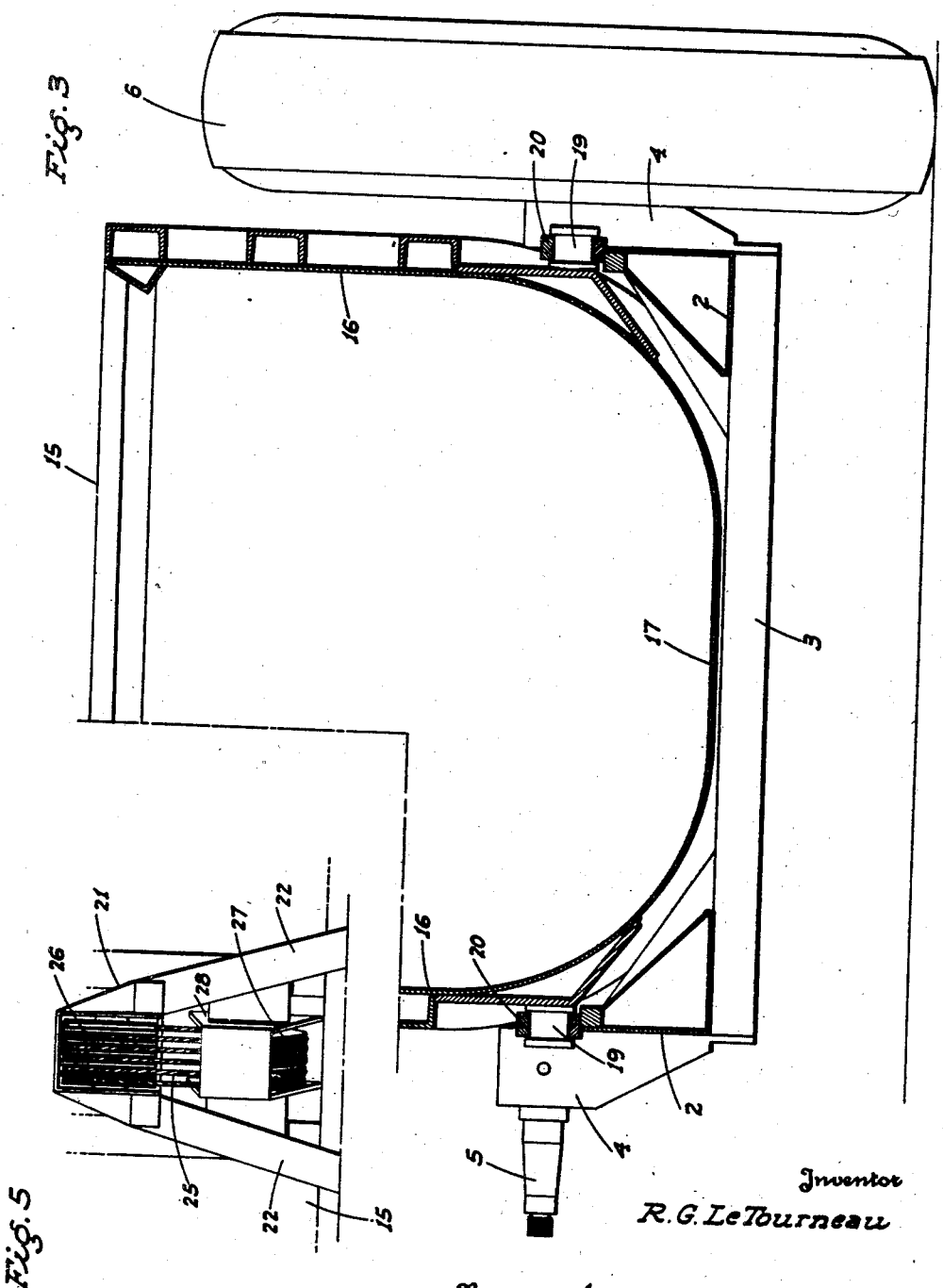

Patented Apr. 8, 1947

2,418,588

UNITED STATES PATENT OFFICE 2,418,588

SELF-PROPELLED DUMP WAGON

Robert G. Le Tourneau, Peoria, Ill., assignor to R. G. Le Tourneau, Inc., Stockton, Calif., a corporation of California Application July 17, 1944, Serial No. 545,374

3 Claims. (Cl. 298—19)

This invention relates in general to an improved material hauling implement, and in particular the invention is directed to, and it is an object to provide, a self-propelled dump wagon of novel construction.

Another object of the invention is to provide a dump wagon which includes, in combination with a pivotally mounted, tiltable dump body, a compact, cable actuated lift assembly operative to impart a positive and relatively high tilt to said body for dumping of the load; said lift assembly being so arranged that a substantially direct upward lift is imparted to the dump body at all points in its path of movement.

An additional object of the invention is to provide a dump wagon, as in the preceding paragraph, in which said lift assembly includes an upstanding mast pivotally mounted adjacent one end of the dump body for swinging movement lengthwise of the implement, and a block and tackle unit connected between the upper end of said mast and said one end of the dump body; the body being pivoted on a transverse axis adjacent its other end for upward tilting to dumping position.

A further object of the invention is to produce a practical and efficient implement and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 3 is a fragmentary transverse section taken through the dump body at its pivotal axis.

Figure 4 is a fragmentary cross section on line 4—4 of Fig. 1.

Figure 5 is a fragmentary transverse elevation showing the relative positions of the upper and lower blocks of the mast supported block and tackle unit when the dump body is fully raised.

Figure 1:
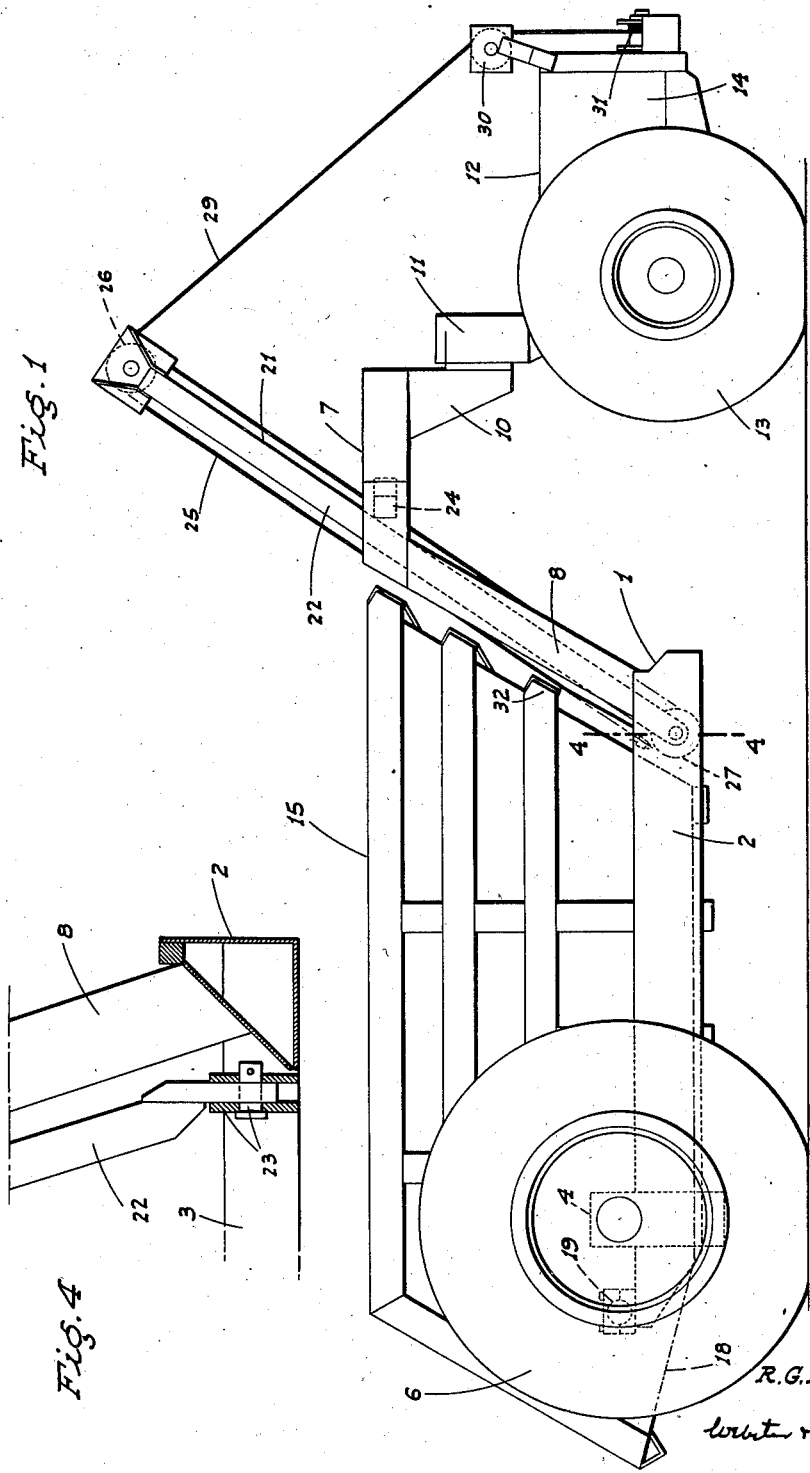
Figure 1 is a side elevation of the implement with the dump body in lowered or transport position.

Referring now more particularly to the drawings, the implement comprises a longitudinally extending horizontal main frame indicated generally at 1 which comprises transversely spaced side beams 2 of heavy duty construction, here shown as being generally triangular in cross section. At spaced points in the length thereof, the side beams 2 are connected in rigid relation by cross beams 3.

Adjacent but short of its rear end, the frame 1 is fitted on the opposite sides with brackets 4, each of which carries a spindle 5 on which a pneumatic tired ground engaging wheel 6 is rotatably mounted. If desired, such wheels may incorporate therein an operator controlled brake structure.

At the forward end, the frame 1 includes an upwardly and forwardly inclined draft yoke indicated generally at 7, and which yoke includes transversely spaced upwardly converging legs 8 and similarly spaced forwardly projecting draft members 9 fixed in connection with the upper ends of said legs. At their forward ends, the draft members 9 are secured in connection with a depending tongue or web 10 which is coupled by an upstanding draft unit 11 in vertically inflexible but horizontally steerable relation to the rear end portion of a two-wheel tractor, the latter being indicated generally at 12. Such tractor includes a pair of transversely spaced pneumatic tired ground engaging wheels 13 driven by a forwardly projecting frame supported engine assembly 14. In practice, the tractor includes an operator's seat, control levers, etc., which are here omitted, and the wheels 13 are arranged to be selectively driven whereby to steer the implement.

An upwardly opening dump body 15, elongated lengthwise of the implement and of substantial width, is mounted in connection with and projects upwardly from the frame 1 as follows:

The dump body 15 includes sides 16 and a rounded bottom 17; the rear end of said dump body being open and the bottom 17 at the rear end portion thereof being inclined slightly at an upward and rearward direction as shown in 18. The purpose of this inclined bottom portion at the rear end of the dump body is to permit of movement thereof to a steeper dumping position than would otherwise be possible, and as will be evident.

Adjacent its rear end and slightly above the bottom thereof, the dump body 15 is pivoted on opposite sides in connection with the side beams 2 by trunnions 19 which engage in journals 20 seated on said side beams.

The front end of the dump body 15 is inclined forwardly and upwardly, with the lower portion of said dump body disposed somewhat rearwardly of the forward end of the frame 1; said inclined front end of the dump body being substantially parallel, when the body is lowered, to the legs 8 of the draft yoke 7.

A mast unit 21 which comprises transversely spaced, upwardly converging posts 22 is pivotally connected at the lower ends of said posts by clevis and pin units 23 to the foremost one of the cross beams 3, whereby the mast 21 may swing about the units 23 lengthwise of the implement. In its normal position, the mast 21 extends at a forward and upward incline substantially parallel to and between the legs 8 of draft yoke 7; the mast then resting against a cross member 24 which extends between the draft members 9 of said yoke.

A cable type block and tackle assembly, indicated generally at 25, is connected between the upper end of the mast 21 and the forward end of the dump body 15 adjacent the bottom end centrally of the sides of the latter. As shown in Fig. 5, the upper block 26 of the block and tackle unit 25 is rigidly mounted on the upper end of mast 21, while the lower block 27 of said unit is fixed to the dump body by means of a support 28; said upper and lower blocks being in alinement transversely of the implement.

A pull reach 29 extends from the upper block 26 of the unit 25 forwardly and downwardly over a direction changing sheave 30 on the front of the tractor 12, and from said sheave the pull reach depends to a front end operator controlled power winch 31 driven from the tractor engine, and as usual including a holding brake.

When the above described, self-propelled dump wagon is in use, the dump body 15 and the mast 21 occupy the relative positions shown in Fig. 1 when the implement is being loaded, and for transport.

Figure 2:
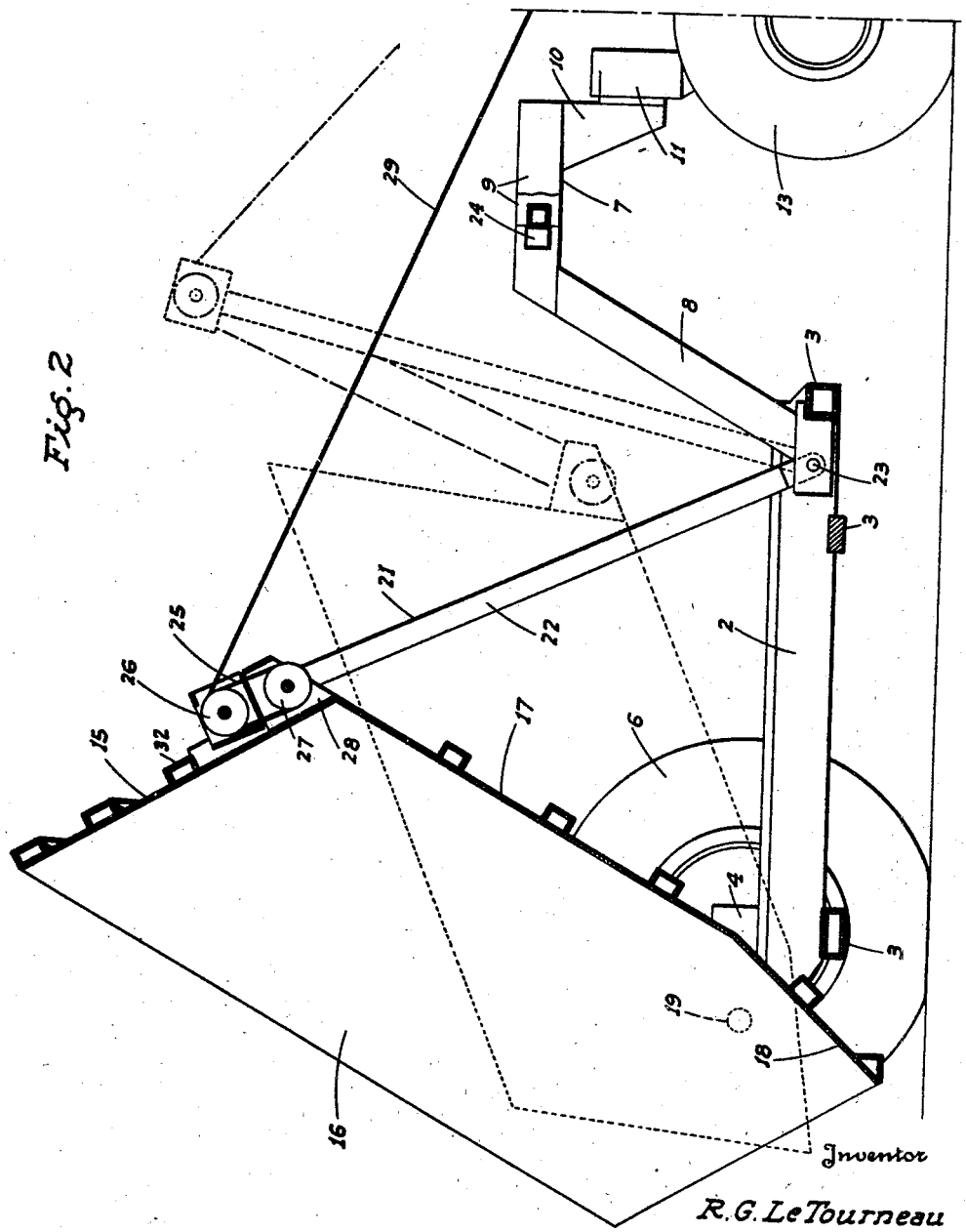
Figure 2 is a fragmentary sectional elevation of the implement showing the dump body in fully raised or dumping position; the position of the body when partially raised being shown in dotted lines.

At the point where the load is to be discharged, the operator actuates the winch 31 in a direction to shorten the then extended block and tackle unit 25. With progressive shortening of said block and tackle unit 25, the lowermost block 27 is correspondingly lifted, causing the dump body to be tilted in an upward and rearward direction for discharge of the load. As said body 15 tilts upwardly and rearwardly, the mast 21 tends to follow the same and swings rearwardly about its pivots 23, as illustrated in Fig. 2. By reason of such swinging movement of the mast, the block and tackle unit 25 exerts a substantially direct upward pull on the front end of the dump body at all points in its path of movement. This is important as it provides a very favorable leverage for the accomplishment of the dumping operation.

When the dump body 15 is fully raised as shown in Fig. 2, the upper and lower blocks 26 and 27 are substantially engaged. Thereafter, when it is desired to lower the body, the operator slacks off on the pull reach 29, permitting the block and tackle unit 25 to lengthen under the gravitational force exerted thereon by said body, whereupon the body and the mast swing forward and reassume their starting position.

When the body is fully raised, the housing of the upper block 26 is under the lower front crossbeam 32 of body 15, as shown in Fig. 2. In the event of cable breakage therefore, this housing would engage and support said crossbeam, and prevent the body from falling, the body being then held up by the mast 21 until it could be lowered without damage.

From the foregoing description it will be readily seen that I have produced such an implement as substantially fulfills the objects of the invention as set forth herein.

While this specification sets forth in detail the present and preferred construction of the implement, still in practice such deviations from such detail may be resorted to as do not form a departure from the spirit of the invention, as defined by the appended claims.

Having thus described my invention, what I claim as new and useful and desire to secure by Letters Patent is:

1. A self-propelled dump wagon comprising a wheel supported frame coupled in unitary but steerable relation to a tractor, a rear end discharge dump body pivoted adjacent its rear end on the frame for upward and rearward tilting movement, a mast upstanding from the frame adjacent but ahead of the body, said mast being swingable lengthwise of the frame, a block and tackle unit connected between the forward end of the body and an elevated point on the mast, said unit including a pull reach extending forwardly and downwardly and a power winch on the tractor, the pull reach being connected to said winch; the tractor being of two-wheel type, and the power winch being mounted on the forward end thereof.

2. A self-propelled dump wagon comprising a wheel supported frame coupled in unitary but steerable relation to a tractor, a rear end discharge dump body pivoted adjacent its rear end on the frame for upward and rearward tilting movement, a mast upstanding from the frame adjacent but ahead of the body, said mast being swingable lengthwise of the frame, a block and tackle unit connected between the forward end of the body and an elevated point on the mast, said unit including a pull reach extending forwardly and downwardly and a power winch on the tractor, the pull reach being connected to said winch; the mast normally extending at a forward and upward incline, and the power winch being mounted on the forward portion of the tractor.

3. A dump wagon comprising a wheel mounted frame, such frame including a pair of upwardly and forwardly projecting legs spaced apart and forming a draft yoke at the forward end of the frame, a cross member extending between said legs adjacent their upper forwardly projecting ends, a dump body pivoted to the frame adjacent its rear end and adapted for upward and rearward tilting movement about its pivot, a mast pivoted to the frame adjacent the lower ends of said legs, said mast normally projecting upwardly and forwardly and resting by gravity against said cross member, and power actuated lifting means connected between the free end of the body and an elevated point on said mast.

ROBERT G. LE TOURNEAU.

REFERENCES CITED

The following references are of record in the file of this patent:

UNITED STATES PATENTS

| Number | Name | Date |
|---|---|---|
| 2,288,630 | Le Tourneau | July 7, 1942 |
| 1,418,387 | Mayer | June 6, 1922 |
| 2,299,372 | Barrett | Oct. 20, 1942 |

FOREIGN PATENTS

| Number | Country | Date |
|---|---|---|
| 107,347 | Australian | May 18, 1939 |